(12) United States Patent  
Hwang et al.

(10) Patent No.: US 10,902,056 B2  
(45) Date of Patent: Jan. 26, 2021

(54) METHOD AND APPARATUS FOR PROCESSING IMAGE

(71) Applicants: Samsung Electronics Co., Ltd., Suwon-si (KR); Seoul National University R&DB Foundation, Seoul (KR)

(72) Inventors: Seong-taek Hwang, Pyeongtaek-si (KR); Sang-doo Yun, Seoul (KR); Ha-wook Jeong, Seoul (KR); Jin-young Choi, Seoul (KR); Byeong-ho Heo, Incheon (KR); Woo-sung Kang, Hwaseong-si (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 15/474,400

(22) Filed: Mar. 30, 2017

(65) Prior Publication Data

US 2017/0206227 A1    Jul. 20, 2017

Related U.S. Application Data

(63) Continuation of application No. 14/532,483, filed on Nov. 4, 2014, now Pat. No. 9,639,758.

(30) Foreign Application Priority Data

Nov. 6, 2013    (KR) .......................... 10-2013-0134372

(51) Int. Cl.
*G06F 17/30* (2006.01)
*G06K 9/46* (2006.01)
(Continued)

(52) U.S. Cl.
CPC .......... *G06F 16/5866* (2019.01); *G06F 16/51* (2019.01); *G06F 16/5854* (2019.01);
(Continued)

(58) Field of Classification Search
CPC ...... G06K 9/6255; G06K 9/66; G06K 9/6216; G06K 9/00228; G06K 9/6217;
(Continued)

(56) References Cited

U.S. PATENT DOCUMENTS 7,873,190 B2    1/2011    Yuasa et al.
7,925,076 B2    4/2011    Abe et al.
(Continued)

FOREIGN PATENT DOCUMENTS

JP    2007-141070 A    6/2007
JP    2007-299364 A    11/2007
(Continued)

OTHER PUBLICATIONS

Korean Office Action dated Jan. 9, 2020, issued in Korean Patent Application No. 10-2013-0134372.

*Primary Examiner* — Iman K Kholdebarin
(74) *Attorney, Agent, or Firm* — Jefferson IP Law, LLP

(57) ABSTRACT

Processing an image includes acquiring, by the image processing apparatus, a target image, extracting a shape of a target object included in the target image, determining a category including the target object based on the extracted shape, and storing the target image by mapping the target image with additional information including at least one keyword related to the category.

21 Claims, 13 Drawing Sheets

(51) Int. Cl.
  *G06F 16/58* (2019.01)
  *G06F 16/51* (2019.01)
  *G06F 16/583* (2019.01)
  *G06K 9/00* (2006.01)
  *G06K 9/62* (2006.01)

(52) U.S. Cl.
  CPC .......... *G06K 9/00671* (2013.01); *G06K 9/46* (2013.01); *G06K 9/6215* (2013.01)

(58) Field of Classification Search
  CPC ...... G06K 9/6227; G06K 9/6254; G06K 9/68; G06K 9/80; G06K 9/6407; G06K 9/222; G06K 9/6296; G06F 17/30249; G06F 17/30252
  See application file for complete search history.

(56) References Cited

U.S. PATENT DOCUMENTS

| | | | |
|---|---|---|---|
| 8,340,451 B2 | 12/2012 | Noguchi et al. | |
| 8,447,139 B2 | 5/2013 | Guan et al. | |
| 8,498,489 B2 | 7/2013 | Abe et al. | |
| 8,831,352 B2* | 9/2014 | Gao | G06K 9/00671 |
| | | | 382/190 |
| 8,988,499 B2 | 3/2015 | Noda | |
| 8,988,500 B2 | 3/2015 | Noda et al. | |
| 9,092,865 B2* | 7/2015 | Chudy | G06K 9/00671 |
| 9,292,926 B1* | 3/2016 | Tang | G06T 7/571 |
| 9,294,475 B2* | 3/2016 | Hoyos | G06K 9/00228 |
| 9,639,758 B2* | 5/2017 | Hwang | G06F 16/5866 |
| 2003/0074671 A1 | 4/2003 | Murakami et al. | |
| 2006/0069999 A1 | 3/2006 | Mitsuhashi | |
| 2006/0120564 A1* | 6/2006 | Imagawa | G06F 3/0304 |
| | | | 382/103 |
| 2007/0183665 A1 | 8/2007 | Yuasa et al. | |
| 2007/0201729 A1 | 8/2007 | Yuasa et al. | |
| 2009/0268967 A1* | 10/2009 | Simon | G06T 7/80 |
| | | | 382/195 |
| 2010/0077003 A1* | 3/2010 | Kondo | G06F 16/5838 |
| | | | 707/780 |
| 2010/0226593 A1* | 9/2010 | Gerhard | G06F 16/51 |
| | | | 382/299 |
| 2010/0266181 A1 | 10/2010 | Oeckl et al. | |
| 2011/0110597 A1 | 5/2011 | Abe et al. | |
| 2011/0255743 A1 | 10/2011 | Guan et al. | |
| 2012/0120060 A1 | 5/2012 | Noda | |
| 2012/0120064 A1 | 5/2012 | Noda et al. | |
| 2012/0121127 A1 | 5/2012 | Aoki et al. | |
| 2012/0233314 A1* | 9/2012 | Jakobsson | G06Q 20/401 |
| | | | 709/224 |
| 2013/0011016 A1 | 1/2013 | Haas et al. | |
| 2013/0034295 A1 | 2/2013 | Tsuchinaga et al. | |
| 2013/0069867 A1 | 3/2013 | Watanabe | |
| 2014/0019867 A1* | 1/2014 | Lehtiniemi | H04W 4/021 |
| | | | 715/738 |
| 2014/0071131 A1 | 3/2014 | Kitago | |
| 2014/0149376 A1 | 5/2014 | Kutaragi et al. | |
| 2014/0161346 A1 | 6/2014 | Ishiyama et al. | |
| 2014/0348379 A1* | 11/2014 | Kraegeloh | G06F 3/0321 |
| | | | 382/103 |
| 2014/0375687 A1 | 12/2014 | Tanaka | |
| 2015/0043828 A1* | 2/2015 | Valente | G06K 9/46 |
| | | | 382/201 |
| 2015/0125073 A1* | 5/2015 | Hwang | G06K 9/00671 |
| | | | 382/159 |
| 2015/0130838 A1* | 5/2015 | Kasahara | G06K 9/00604 |
| | | | 345/633 |
| 2015/0195511 A1 | 7/2015 | Noda | |
| 2016/0253067 A1* | 9/2016 | Webb | A63F 13/00 |
| | | | 463/31 |
| 2016/0330459 A1* | 11/2016 | Choi | H04N 19/597 |
| 2016/0338604 A1* | 11/2016 | Wang | G06K 9/622 |
| 2016/0378788 A1* | 12/2016 | Panneer | G06K 9/209 |
| | | | 382/118 |
| 2018/0197040 A1* | 7/2018 | Krishnamurthi | G06F 3/0482 |

FOREIGN PATENT DOCUMENTS

| | | |
|---|---|---|
| KR | 10-2007-0056522 A | 6/2007 |
| WO | 2012/077287 A1 | 6/2012 |

* cited by examiner

FIG. 6

| | |
|---|---|
| 601 | Image_1001.jpg |
| 602 | Person, Table, Chair |
| 603 | (28, 60, 10, 20) |
| 604 | Restaurant, Indoor |
| 605 | 1xxyyzz |
| 606 | 2014.12.24 |
| 607 | 12h 20m |
| 608 | 2xx lux |
| 609 | Noisy |

METHOD AND APPARATUS FOR PROCESSING IMAGE

CROSS-REFERENCE TO RELATED APPLICATION(S)

This application is a continuation application of prior application Ser. No. 14/532,483, filed on Nov. 4, 2014, which claimed the benefit under 35 U.S.C. § 119(a) of a Korean patent application filed on Nov. 6, 2013 in the Korean Intellectual Property Office and assigned Serial number 10-2013-0134372, the entire disclosure of which is hereby incorporated by reference.

JOINT RESEARCH AGREEMENT

The present disclosure was made by or on behalf of the below listed parties to a joint research agreement. The joint research agreement was in effect on or before the date the present disclosure was made and the present disclosure was made as a result of activities undertaken within the scope of the joint research agreement. The parties to the joint research agreement are 1) Samsung Electronics Co., Ltd. and 2) Seoul National University R&DB Foundation.

TECHNICAL FIELD

The present disclosure relates to a method and apparatus for processing an image. More particularly, the present disclosure relates to a method and apparatus for processing an image, in which a category including an object presented by a target image is determined and a predetermined operation is performed based on a result of the determination.

BACKGROUND

As various multimedia systems based on image information develop, a demand for technologies that enable understanding of information included in an image and an application of the information to a variety of fields is rapidly increasing.

In particular, as mobile devices such as mobile phones, notebook computers, or personal digital assistants (PDAs) further include an image capturing function like a camera, there is an increased demand for a technology to facilitate the management of the many images captured by a user using the mobile device. Also, a technology that analyzes information included in an image captured using the mobile device may be used to provide a user-friendly mobile device operation method that uses information about an environment surrounding the user or mobile device.

As the technology to analyze information included in an image, an object detection technology for detecting (from an image) a category of an object presented by the image is typically used. The object detection technology may be used not only in a field providing a convenient user environment through a mobile device but also in a variety of fields such as diagnosis of disease, autonomous mobile robots, etc. Accordingly, the development of an object detection technology with high accuracy and fast speed is receiving much interest.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned demand and to provide at least the advantages described below. Accordingly, an aspect of the present disclosure is to provide a method and apparatus for processing an image which may provide a convenient user environment to a user using a predetermined device by analyzing information included in an image.

Additional aspects will be set forth in part in the description which follows and, in part, will be apparent from the description, or may be learned by practice of the presented embodiments.

In accordance with an aspect of the present disclosure, a method of processing an image by using an image processing apparatus is provided. The method includes acquiring, by the image processing apparatus, a target image, extracting a shape of a target object included in the target image, determining a category including the target object based on the extracted shape, and storing the target image by mapping the target image with additional information including at least one keyword related to the category.

The method may further include receiving a keyword from a user, searching for the target image mapped with the additional information related to the received keyword, and displaying the target image.

The acquiring of the target image may include acquiring information indicating a time when the target image is acquired, and the additional information may further include at least one keyword related to the information indicating the time.

The method may further include acquiring first position information of the image processing apparatus, acquiring spatial information related to the category, and generating second position information of the image processing apparatus based on the spatial information and the first position information.

The extracting of the shape of the target object included in the target image may include extracting a feature map indicating an intensity gradient of pixels of the target image, and the determining of the category including the target object may include comparing the extracted feature map with at least one of feature map models that are previously learned with respect to a shape of an object included in a first category.

The comparing of the extracted feature map with the at least one of the feature map models may include calculating a reaction value of a filter designed based on the at least one of the feature map models with respect to the extracted feature map, and if the reaction value is less than a critical value allotted to the at least one of the feature map models, determining that the target object is not included in the first category.

The comparing of the extracted feature map with the at least one of the feature map models may include performing a first determination process of determining whether the target object is included in the first category by comparing the extracted feature map with a root model that is a previously learned feature map model with respect to an entire shape of an object included in the first category, and if the target object is determined to be included in the first category according to a result of the first determination process, comparing the extracted feature map with at least one part model of part models that are previously learned feature map models with respect to shapes of parts of an object included in the first category.

The extracting of the feature map may include extracting a first feature map from the target image at a first resolution to compare with the root model, and extracting a second feature map from the target image at a second resolution to compare with the at least one part model of the part models, the first resolution being lower than the second resolution.

The comparing of the extracted feature map with the at least one part model of the part models may include selecting at least one part model of the part models based on a priority order of the part models, and comparing the extracted feature map with the selected part model.

The comparing of the extracted feature map with the at least one part model of the part models may include comparing the extracted feature map with the at least one part model of the part models considering position information of the part models with respect to the root model.

In accordance with another aspect of the present disclosure, an image processing apparatus is provided. The image processing apparatus includes an image acquirer configured to acquire a target image, an image analyzer configured to extract a shape of a target object included in the target image and to determine a category including the target object based on the extracted shape, and a controller configured to control a storage unit to store the target image by mapping the target image with additional information including at least one keyword related to the category.

The image processing apparatus may further include a user input unit configured to receive a keyword from a user, and a display unit configured to display the target image mapped with the additional information related to the received keyword, wherein the controller is further configured to search the storage unit for the target image mapped with the additional information related to the received keyword.

The image acquirer may be further configured to acquire information indicating a time when the target image is acquired, and the additional information may further include at least one keyword related to the information indicating the time.

The image processing apparatus may further include a position detection unit configured to acquire first position information of the image processing apparatus, wherein the controller is further configured to acquire spatial information related to the category and to generate second position information of the image processing apparatus based on the spatial information and the first position information.

The image analyzer may include a feature map extractor configured to extract a feature map indicating an intensity gradient of pixels of the target image, and to compare the extracted feature map with at least one of feature map models that are previously learned with respect to a shape of an object included in a first category.

The image analyzer may be further configured to calculate a reaction value of a filter designed based on the at least one of the feature map models with respect to the extracted feature map, wherein, if the reaction value is less than a critical value allotted to the at least one of the feature map models, the target object may be determined not to be included in the first category.

The image analyzer may be further configured to perform a first determination process of determining whether the target object is included in the first category by comparing the extracted feature map with a root model that is a previously learned feature map model with respect to an entire shape of an object included in the first category and, if the target object is determined to be included in the first category according to a result of the first determination process, to compare the extracted feature map with at least one part model of part models that are previously learned feature map models with respect to shapes of parts of an object included in the first category.

The feature map extractor may include a learning unit configured to generate the part models with respect to parts of the object by extracting a first feature map from the target image at a first resolution to compare with the root model and extracting a second feature map from the target image at a second resolution to compare with the at least one part model of the part models, the first resolution being lower than the second resolution.

The image analyzer may be further configured to select at least one part model of the part models based on a priority order of the part models, and to compare the extracted feature map with the selected part model.

A non-transitory computer readable storage medium having stored thereon a program, which when executed by a computer, performs any of the above methods.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates an example of additional information that is mapped with a target image according to an embodiment of the present disclosure;

Throughout the drawings, it should be noted that like reference numbers are used to depict the same or similar elements, features, and structures.

DETAILED DESCRIPTION

Figure 1:
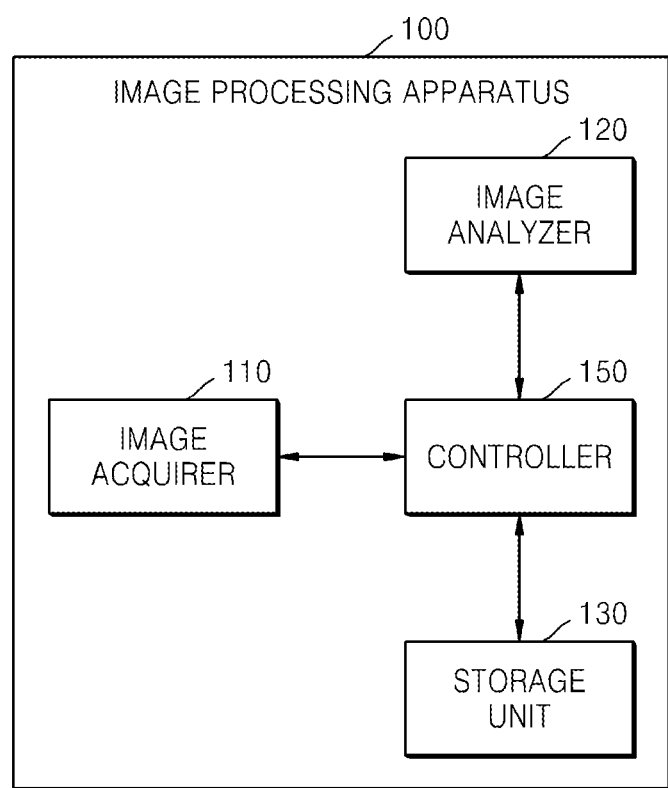
FIG. 1 is a block diagram describing an image processing apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

In the present specification, when a constituent element "connects" or is "connected" to another constituent element, the constituent element contacts or is connected to the other constituent element not only directly, but also electrically through at least one of other constituent elements interposed therebetween. Also, when a part may "include" a certain constituent element, unless specified otherwise, it may not be construed to exclude another constituent element but may be construed to further include other constituent elements.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, terms such as " . . . unit", "~module", etc. stated in the specification may signify a unit to process at least one function or operation and the unit may be embodied by hardware, software, or a combination of hardware and software.

FIGS. 1 through 13, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a block diagram describing an image processing apparatus according to an embodiment of the present disclosure.

Referring to FIG. 1, an image processing apparatus 100 according to the present disclosure may be included in a mobile device or connected thereto. The mobile device may be a mobile phone, a smartphone, a notebook computer, a terminal for digital broadcasting, a personal digital assistant (PDA), a portable multimedia player (PMP), and a navigation device, but not limited thereto.

The image processing apparatus 100 of FIG. 1 may include an image acquirer 110, an image analyzer 120, a storage unit 130, and a controller 150.

The image acquirer 110 acquires a target image. To acquire the target image, the image acquirer 110 may receive an input of a signal including information about the target image from the outside or may capture the target image.

The image acquirer 110 may include a camera having a shutter, a lens unit, an aperture, an image sensor, and an analog-to-digital converter (ADC). The image acquirer 110 may acquire the target image by processing an image frame obtained from the image sensor. Also, the image acquirer 110 may further acquire information indicating a time when the target image is acquired or about a surrounding environment, in addition to capturing the target image. The information about a surrounding environment may include information about illuminance and/or noise levels of a space where the target image is acquired, at the time when the target image is acquired.

The image analyzer 120 extracts the shape of a target object included in the target image. The image analyzer 120 determines a category including the target object based on the shape extracted from the target image. The "target image" may denote an image subject to image processing. The "target object" denotes an object presented by the target image. The "category" may denote a standard for classifying objects having the same properties. For example, objects such as roses, lilies, or tulips may be determined to be included in a category named "flowers". The category may be, for example, any one of cars, bicycles, persons, trees, flowers, buildings, etc.

Also, the image analyzer 120 may determine whether the target image includes an image of an object included in a predetermined category. The image analyzer 120 may determine one category and then determine whether the target object presented by the target image is included in the determined category. Also, the image analyzer 120 may determine in which of a plurality of categories an object presented by the target image is included.

The image analyzer 120 may determine at least one of categories including at least one of the target objects. The target objects that are different from each other may be included in one category or different categories. In other words, the image analyzer 120 may extract the shapes of a plurality of target objects from the target image. The image analyzer 120 may determine one or more categories including a plurality of target objects.

An object detection method, by which the image analyzer 120 determines a category of the target object, is described below with reference to FIGS. 9 to 13.

The storage unit 130 stores the target image and information related to the target image. The storage unit 130 may further store at least one of a category, information about the shape of an object included in the category, and a feature map model of the category. Also, the storage unit 130 may store programs for image processing and controlling of the image processing apparatus 100.

The storage unit 130 may include at least one type of storage media, for example, flash memory type memory, hard disk type memory, multimedia card micro type memory, card type memory, for example, secure digital (SD) or extreme digital (XD) memory, random access memory (RAM), static random access memory (SRAM), read-only memory (ROM), electrically erasable programmable ROM (EEPROM), programmable ROM (PROM), magnetic memory, a magnetic disc, an optical disc, etc. Also, the image processing apparatus 100 may operate a web storage or a cloud server that performs a storage function of the storage unit 130 in the Internet.

The controller 150 may control an overall operation of the image processing apparatus 100. In other words, the controller 150 may control the image acquirer 110, the image analyzer 120, and the storage unit 130.

The controller 150 may control the image processing apparatus 100 to perform a predetermined operation corresponding to a result of the analysis, based on the result of the analysis of the image analyzer 120.

The controller 150 may control the storage unit 130 to store additional information by mapping the additional information with the target image. The additional information may include at least one of keywords related to the category including the target object.

An operation of storing at least one of keywords related to an image by mapping the keyword with the image may be referred to "tagging an image". To tag the target image, a method including processes of a user selecting a certain area of the target image and inputting a keyword about the selected area is used. Accordingly, a lot of time is consumed for the user to select an area in the target image and input a keyword and also such operations are inconvenient.

In the image processing apparatus 100 according to the present disclosure, for the category that is determined including the target object, the target image is automatically tagged and thus the target image may be automatically classified. Accordingly, the image processing apparatus 100 according to the present disclosure may facilitate a user's convenience in classifying, storing, and managing several images. Also, the image processing apparatus 100 is capable of classifying, storing, and managing several images within a short time.

Figure 2:
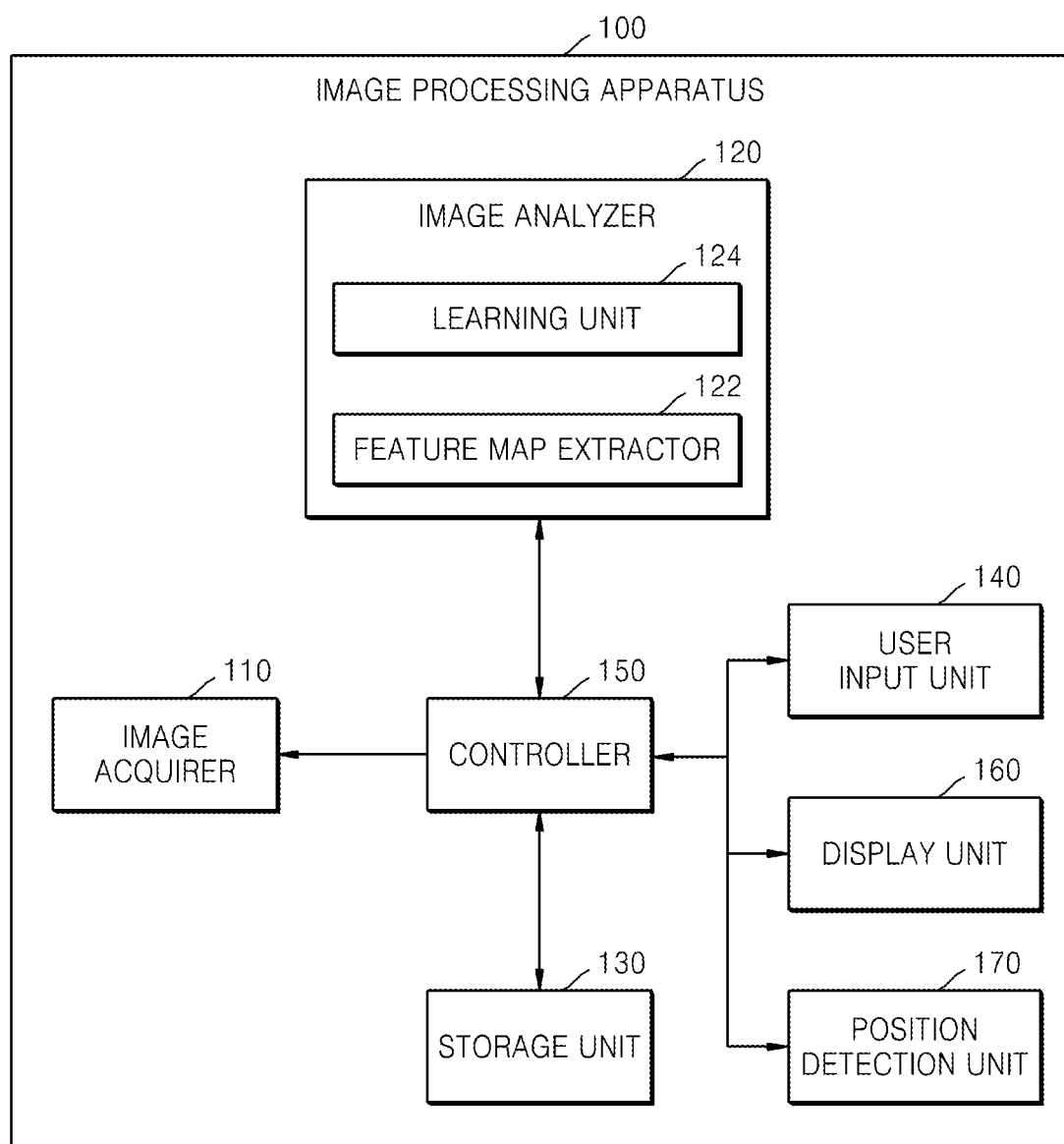
FIG. 2 is a detailed block diagram describing an image processing apparatus illustrated in FIG. 1, according to an embodiment of the present disclosure.

FIG. 2 is a detailed block diagram describing an image processing apparatus, according to an embodiment of the present disclosure.

As illustrated in FIG. 2, an image processing apparatus 100 may include an image acquirer 110, an image analyzer 120, a storage unit 130, a user input unit 140, a controller 150, a display unit 160, and a position detection unit 170. Also, as illustrated in FIG. 2, the image analyzer 120 may include a feature map extractor 122 and a learning unit 124.

The feature map extractor 122 may extract a feature map indicating an intensity gradient of pixels of the target image, from the target image. The feature map may signify a histogram generated in units of blocks by using the amount and direction of the intensity gradient of the pixels of the target image. In other words, the feature map extracted from the target image may include a histogram of oriented gradients (HOG) map. Also, the feature map extractor 122 may further extract feature maps of a plurality of images, from the images acquired to learn general shapes of the objects included in the category.

The learning unit 124 may learn a plurality of images presenting objects included in the category in order to learn the general shapes of the objects included in the category. Also, the learning unit 124 may learn the general shapes of the objects included in the category by learning a plurality of images presenting objects that are not included in the category with the images presenting the objects included in the category.

The learning unit 124 may generate at a first resolution a root model that is a previously learned feature map model with respect to the entire shapes of objects included in a first category. Also, the learning unit 124 may generate, at a second resolution, a plurality of partial models that are previously learned feature map models with respect to parts of objects included in the first category. The root model with respect to a predetermined object may be generated at a resolution lower than those of the partial models. The resolution of the feature map model is determined according to the size of a block that is a unit for which a histogram is generated.

The user input unit 140 may receive an input of a user. The user input unit 140 may receive an input of a user to control the image processing apparatus 100. Also, the user input unit 140 may receive a keyword from the user.

The user input unit 140 may include a key pad, a dome switch, a touch pad of a capacitive overlay type, a resistive overlay type, an infrared beam type, surface acoustic wave type, an integral strain gauge type, a piezoelectric type, etc., a track ball, a jog wheel, a jog switch, etc., but the present disclosure is not limited thereto.

Also, a touch pad forming a layer structure with a display panel of the display unit 160 may be referred to as a touch screen. When the user input unit 140 is configured with the touch screen, the user input unit 140 may perform a function of the display unit 160.

Also, the user input unit 140 may detect a voice of a user by using an acoustic sensor and receive keywords spoken by the user based on the user's voice.

The display unit 160 may output not only the target image but also various pieces of information processed by the image processing apparatus 100 through a screen (not shown) via a graphic user interface (GUI).

The display unit 160 may include at least one of a liquid crystal display, a thin film transistor-liquid crystal display, an organic light-emitting diode, a flexible display, a 3D display, and an electrophoretic display.

The position detection unit 170 acquires first position information of the image processing apparatus 100 by detecting a position of the image processing apparatus 100. The position detection unit 170 may detect the position of the image processing apparatus 100 by using at least one of a global position system (GPS), a Wi-Fi positioning system, and a hybrid positioning system.

In order to control the overall operation of the image processing apparatus 100 according to the preset embodiment, the controller 150 may further control the user input unit 140, the display unit 160, and the position detection unit 170 which are illustrated in FIG. 2. Also, the controller 150 may be configured to perform at least a part of the function of at least one of the image analyzer 120, the storage unit 130, and the position detection unit 170.

The image processing apparatus 100 according to the present disclosure may perform a predetermined operation based on the category that is determined including the target object.

In the following description, a method of the image processing apparatus 100 according to the present disclosure performing a predetermined operation based on the information that the target image includes is described in detail with reference to FIGS. 3 to 8.

Figure 3:
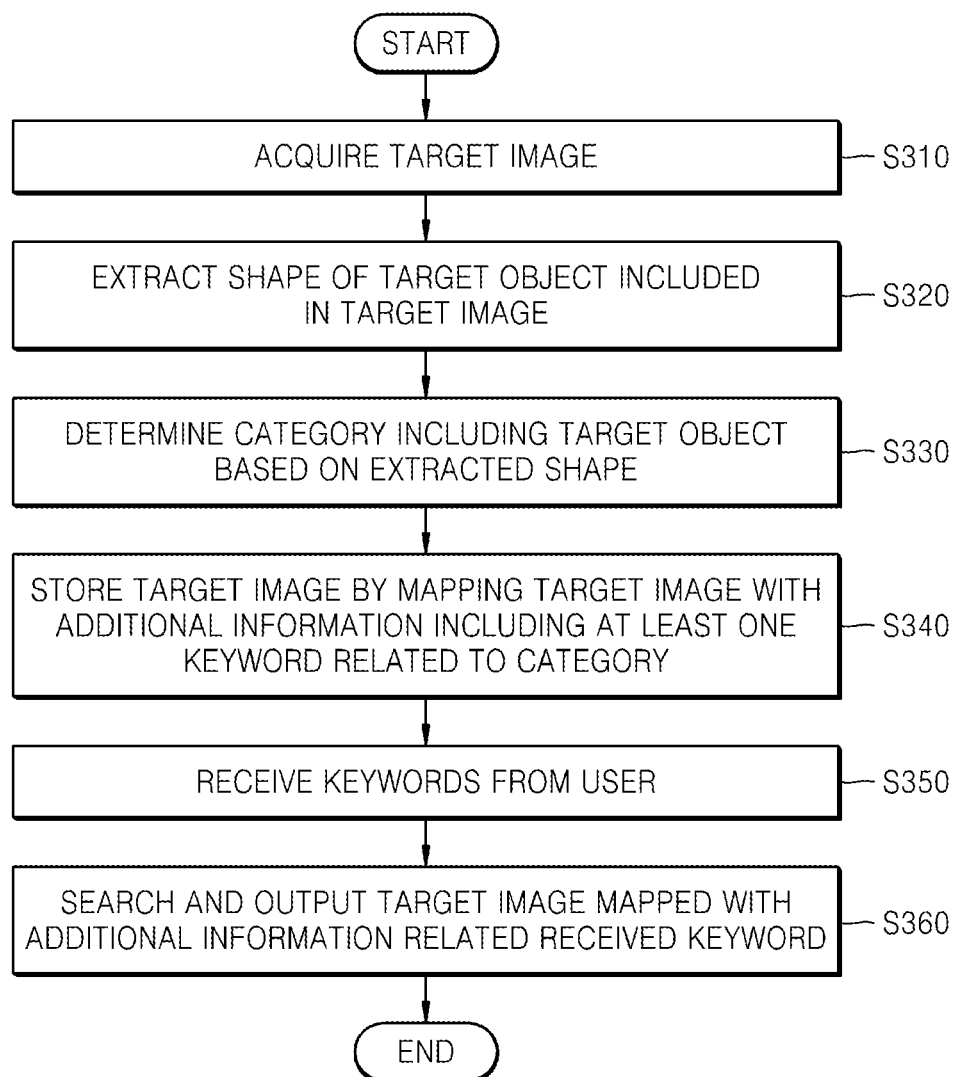
FIG. 3 is a flowchart for explaining an image processing method according to an embodiment of the present disclosure.

FIG. 3 is a flowchart for explaining an image processing method according to an embodiment of the present disclosure.

The image processing method according to the embodiment of the present disclosure may be performed by respective constituent elements of the image processing apparatus 100 of FIGS. 1 and 2. Accordingly, even though there may be omitted descriptions in the following description, it may be seen that the above descriptions about the image processing apparatus 100 of FIGS. 1 and 2 may be applied to the image processing method of FIG. 3.

Referring to FIG. 3, in operation S310, the image processing apparatus according to the present disclosure may acquire a target image. For example, the image processing apparatus may acquire the target image by receiving the target image from outside or by capturing the target image. Also, the image processing apparatus may further acquire information about a date and time when the target image is acquired.

In operation S320, the image processing apparatus according to the present disclosure may extract a shape of a target object included in the target image. For example, the image processing apparatus may extract the shape of the target object by extracting an HOG feature of the target image.

In operation S330, the image processing apparatus according to the present disclosure may determine a category including the target object based on the shape extracted in the operation S320.

For example, the image processing apparatus may select one of a plurality of categories that are previously determined and determine whether the target object is included in the selected category. The image processing apparatus may repeatedly perform, on each of the categories, the operation of determining whether the target object is included in the selected category.

Although FIG. 3 illustrates that the image processing apparatus determines the category of one target object, the present disclosure is not limited thereto. The image processing apparatus according to the present disclosure may determine categories including a plurality of target objects that are presented by the target image.

In operation S340, the image processing apparatus according to the present disclosure may store the target image by mapping the target image with additional information. The additional information may include at least one of keywords related to the category that is determined including the target object.

Figure 5:
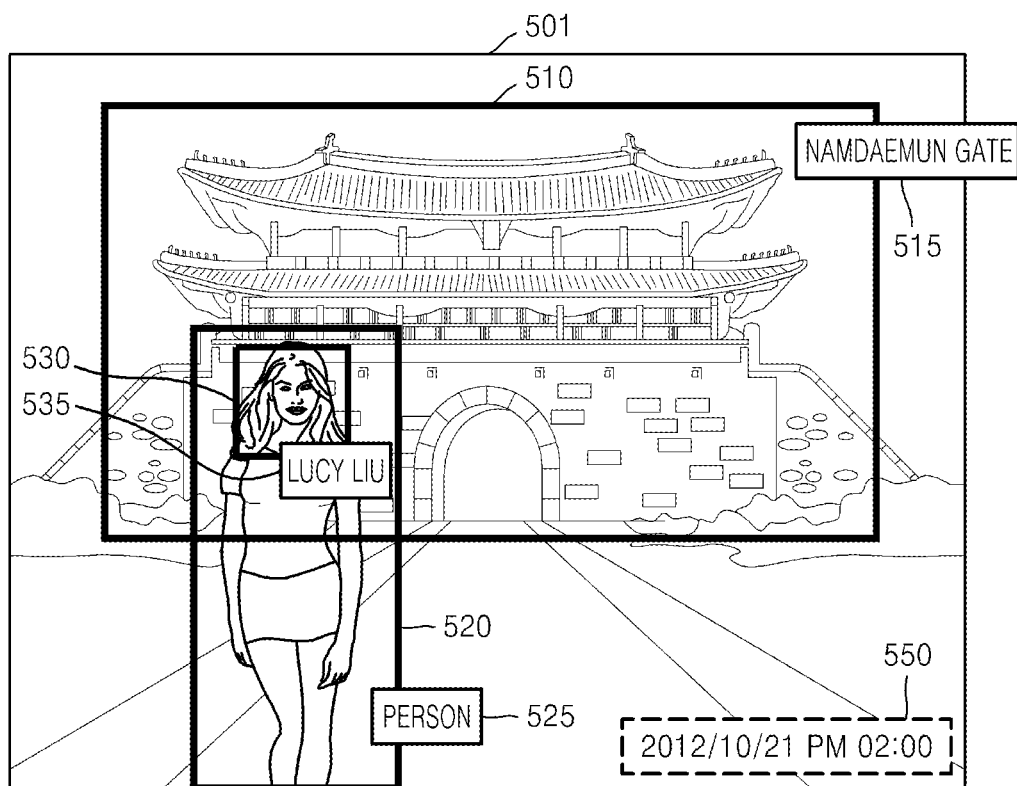
FIG. 5 illustrates a target image that is mapped with additional information and stored according to an embodiment of the present disclosure.

FIG. 5 illustrates a target image that is mapped with additional information and stored according to an embodiment of the present disclosure.

For example, FIG. 5 illustrates that a target image 501 includes a shape 510 of a first target object "Namdaemun gate" and a shape 520 of a second target object "Lucy Liu".

The image processing apparatus may extract the shape 510 of the first target object and the shape 520 of the second target object from the target image 501. The image processing apparatus may determine "Namdaemun gate" as a category including the first target object based on the shape 510 of the first target object. The image processing apparatus may determine "Person" as a category including the second target object based on the shape 520 of the second target object.

The image processing apparatus may store the target image 501 by mapping the target image 501 with additional information including at least one of keywords related to "Namdaemun gate" and "Person". The at least one of keywords related to "Namdaemun gate" may include the name of the category, that is "Namdaemun gate". Also, the at least one of keywords related to "Namdaemun gate" may include "Republic of Korea" or "Seoul" that is a keyword related to spatial information related to the category. The at least one of keywords related to "Person" may include "Person image" that is a keyword related to the type of the target image.

Also, the image processing apparatus may store the related keyword by tagging the same with respect to a partial area of the target image. In other words, referring to FIG. 5, the image processing apparatus may tag "Namdaemun gate" for a partial area including the shape 510 of "Namdaemun gate". The image processing apparatus may tag "Person" for a partial area including the shape 520 of "Person".

When the target object presented by the target image 501 is determined to be included in "Person", as illustrated in FIG. 5, the image processing apparatus may analyze the shape 520 of a person to extract a shape 530 of "Face" of the person.

The image processing apparatus may analyze the shape 530 of "Face" and determine the name of the person corresponding to a result of the analysis. In other words, the image processing apparatus may analyze the target image and detect an area corresponding to the face based on the shape 520 of the person. The image processing apparatus may recognize that the target image 501 is a person with the name "Lucy Liu", from the shape 530 of the face included in an area corresponding to the face. The image processing apparatus may map the target image 501 with the keyword "Lucy Liu" and store the mapped information.

Also, the image processing apparatus may store a keyword related to the information about the date and time when the target image is acquired, as the additional information, in addition to the keyword related to the category including the target object.

For example, as illustrated in FIG. 5, an example case in which the image processing apparatus acquires a target image at "14:00 on 21 Oct. 2012" is described as the information indicating the date and time when the target image is acquired. The image processing apparatus 100 may further store "Autumn", "October", and "Afternoon" that are keywords related to "14:00 on 21 Oct. 2012".

FIG. 6 illustrates an example of additional information that is mapped with a target image according to an embodiment of the present disclosure.

The image processing apparatus according to the present disclosure may store the additional information about a target image with the target image.

For example, the additional information may include at least one of a scene classification result, information about a position of the image processing apparatus when a target image is acquired, a date when the target image is acquired, a time when the target image is acquired, information about illuminance around the image processing apparatus at the time when the target image is acquired, and information about noise around the image processing apparatus at the time when the target image is acquired, by determining a name of a target image, an extension of a target image file, a category including a target object, a relative position of the shape of a target object in a target image, and a category of a target object. The scene classification result may include spatial information related to a category including a target object. The spatial information related to a category may include information about a place where objects included in the category are generally located.

Referring to FIG. 6, an image processing apparatus may store additional information 600, where the additional information includes a name of a target image and a file extension 601, categories including target objects 602, a relative position of a shape of a target object in a target image 603, a scene classification result 604, information about a GPS of the image processing apparatus when a target image is acquired 605, a date when a target image is acquired 606, a time when a target image is acquired 607, information about illuminance around the image processing apparatus at the time when a target image is acquired 608, and information about noise around the image processing apparatus at the time when a target image is acquired.

For example, FIG. 6 illustrates a case in which the image processing apparatus determines the categories including target objects to be "Person", "Table", and "Chair". The image processing apparatus may produce a scene classification result of "Restaurant, indoor" based on information of a place that is "noisy" at an illuminance of "2xx lux" and where "Person", "Table", and "Chair" are located.

Referring back to FIG. 3, in operation S350, the image processing apparatus according to the present disclosure may receive keywords from a user.

The image processing apparatus may receive an input directly from a user to search an image.

Alternatively, the image processing apparatus may receive an input of a first image from the user. The image processing apparatus may receive keywords from the user by extracting the keywords from the first image. For example, when the user desires to search for an image about "Bicycle", the image processing apparatus may acquire a first image by capturing a bicycle, capturing a sketch of a bicycle, or receiving an image of a bicycle through the Internet.

Figure 7A:
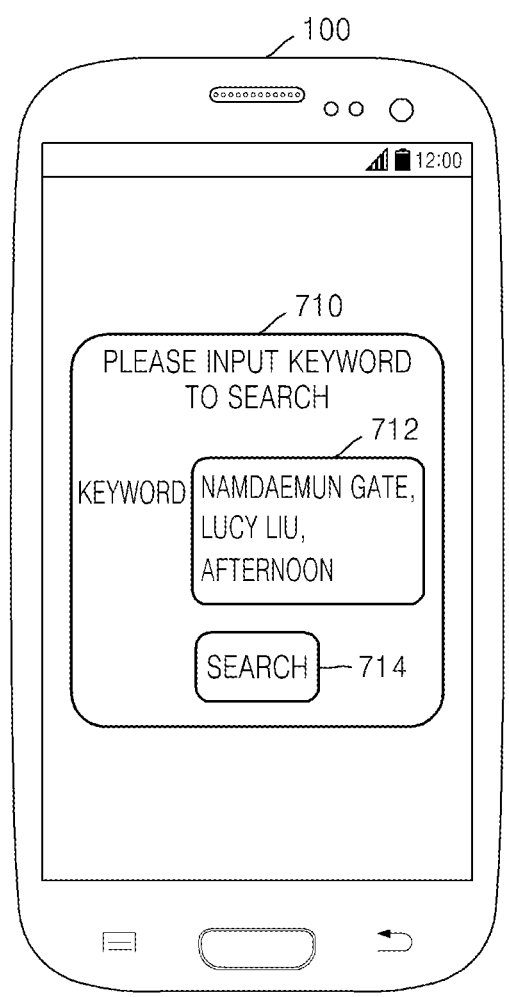
FIG. 7A illustrates an example of a screen for receiving a keyword from a user according to an embodiment of the present disclosure.
Figure 7B:
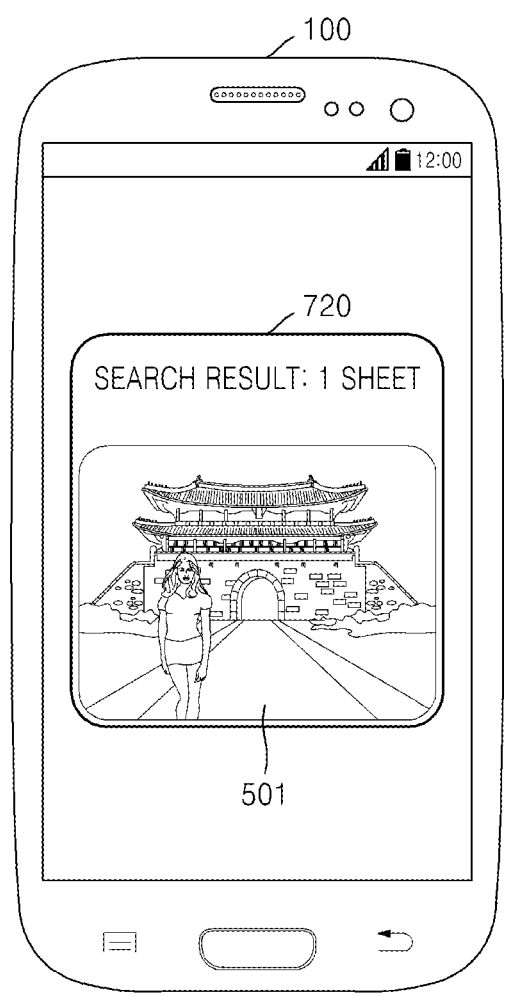
FIG. 7B illustrates an example of a screen for outputting a searched image in relation with a keyword received from a user according to an embodiment of the present disclosure.

FIG. 7A illustrates an example of a screen for receiving a keyword from a user according to an embodiment of the present disclosure, and FIG. 7B illustrates an example of a screen for outputting a searched image in relation with a keyword received from a user according to an embodiment of the present disclosure.

As illustrated in FIGS. 7A and 7B, although an image processing apparatus 100 may be included in a mobile terminal such as a mobile phone, the present disclosure is not limited thereto.

Referring to FIG. 7A, the image processing apparatus 100 is illustrated, where the image processing apparatus 100 may provide a GUI 710 for a keyword input on a screen. The GUI 710 for the keyword input may include an area 721 for inputting a keyword. As illustrated in FIG. 7A, the user may input one or more keywords.

Also, the GUI 710 for the keyword input may include a button 714 for instructing a search for an image related to the keyword.

Referring back to FIG. 3, in operation S360, the image processing apparatus according to the present disclosure may search for a target image mapped with additional information related to a received keyword and output the searched target image.

As illustrated in FIG. 7B, the image processing apparatus 100 may search for a target image 501 related to a keyword received from a user and output the searched target image 501 as a search result 720. Although FIG. 7B illustrates that one target image 501 is searched for, the present disclosure is not limited thereto. The image processing apparatus 100 may search for a plurality of images related to the keyword received from the user and output the searched images.

Also, the image processing apparatus 100 may display the keyword related to the target image on the target image altogether, according to a result of the tagging of the target image. Referring back to FIG. 5, the image processing apparatus may output the target image 501 by displaying in the target image 501 a keyword 515 that is "Namdaemun gate", a keyword 525 that is "Person", and a keyword 535 that is "Lucy Liu", which are determined to be related to the target image 501.

Also, as illustrated in FIG. 5, the image processing apparatus may display information 550 indicating the time when the target image 501 is acquired, on the target image altogether, according to a result that is stored by being mapped with the target image 501.

Figure 4:
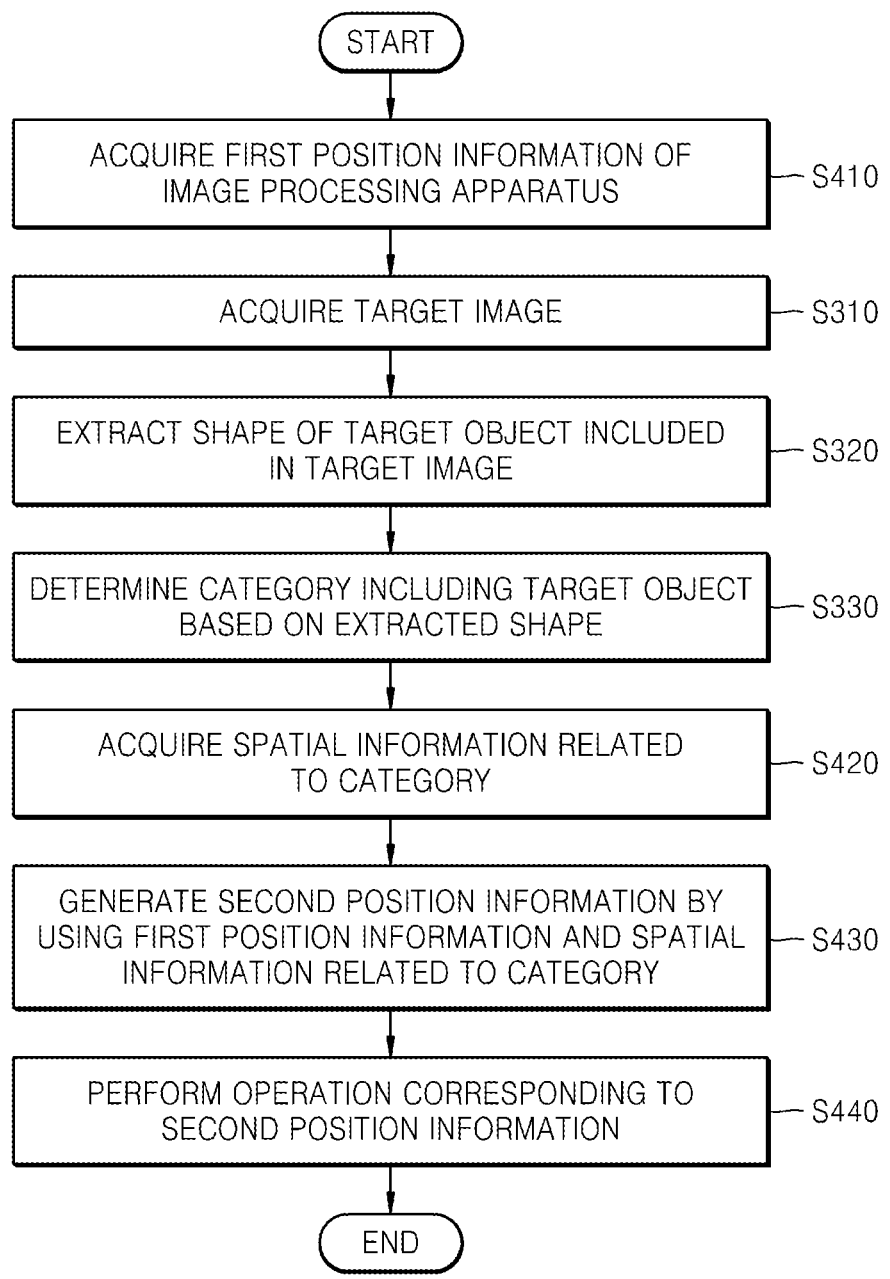
FIG. 4 is a flowchart for explaining an image processing method according to an embodiment of the present disclosure.

FIG. 4 is a flowchart for explaining an image processing method according to an embodiment of the present disclosure.

Referring to FIG. 4, operations S310, S320 and S330 illustrated therein correspond to the operations S310, S320 and S330 of FIG. 3. As such, redundant descriptions thereof are omitted.

As illustrated in FIG. 4, in operation S410, an image processing apparatus according to the present disclosure may acquire first position information of the image processing apparatus. For example, the image processing apparatus may acquire the first position information by using at least one of GPS, a Wi-Fi positioning system, and a hybrid positioning system.

In operation S420, the image processing apparatus according to the present disclosure may acquire spatial information related to a category that is determined including a target object.

The image processing apparatus may determine whether there is any target object that is included in a category around the image processing apparatus, by determining whether the target image presents the target object that is included in the category.

The spatial information related to a category may include information about a place where objects included in the category generally exist. The spatial information related to the category may be previously stored or received by the user. For example, a place related to a category "Chair" may be "School", "Classroom", and "Room". Also, a place related to a category "Car" may be "Road" and "Parking lot".

In operation S430, the image processing apparatus according to the present disclosure may generate second position information by using the first position information and the spatial information related to an object.

The image processing apparatus may generate the second position information that includes more detail than the first position information by processing the first position information by using information included in the target image. Also, the image processing apparatus may generate the second position information about an accurate position of a target object by processing the spatial information related to the target object presented by the target image by using the first position information.

Figure 8:
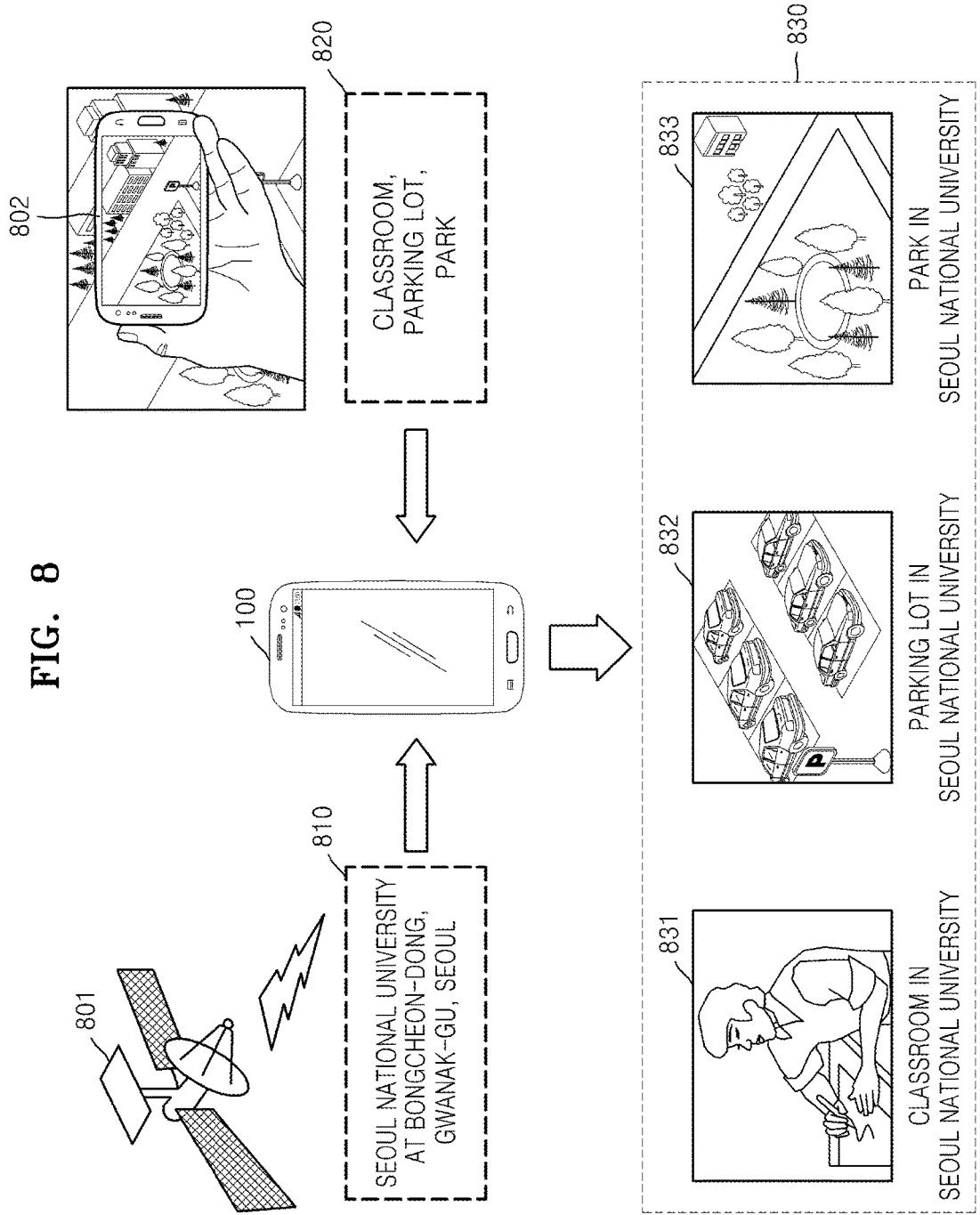
FIG. 8 is a view for describing a process of generating second position information in a second operation mode according to an embodiment of the present disclosure.

FIG. 8 is a view for describing a process of generating second position information in a second operation mode according to an embodiment of the present disclosure.

Although FIG. 8 illustrates an example case of acquiring first position information by using GPS (e.g., a GPS satellite 801), the present disclosure is not limited thereto.

As illustrated in FIG. 8, an image processing apparatus 100 may acquire first position information 810 indicating that the image processing apparatus 100 is located at "Seoul National University at Bongcheon-dong, Gwanak-gu, Seoul" by using GPS.

The image processing apparatus 100 may acquire spatial information 820 related to a certain object by determining whether a target image 802 includes an image of the object. As illustrated in FIG. 8, the image processing apparatus 100 may estimate the place where the image processing apparatus 100 is located, based on a result of an analysis of the target image 802.

For example, when the target object presented by the target image 802 acquired by the image processing apparatus 100 is determined to be included in "Table", "Blackboard", and "Chair", the image processing apparatus 100 may acquire the spatial information 820 that the image processing apparatus 100 is located in "Classroom". Also, when the target object presented by the target image 802 acquired by the image processing apparatus 100 is determined to be included in "Car", "Parking lot", and "Parking lot sign", the image processing apparatus 100 may acquire the spatial information 820 that the image processing apparatus 100 is located in "Parking lot". Also, when the target object presented by the target image 802 acquired by the image processing apparatus 100 is determined to be included in "Tree", "Bench", and "Fountain", the image processing apparatus 100 may acquire the spatial information 820 that the image processing apparatus 100 is located in "Park".

The image processing apparatus 100 may generate second position information 830 by using the first position information 810 and the spatial information 820.

For example, the image processing apparatus 100 may generate second position information 831 indicating that the image processing apparatus 100 is located in a classroom in Seoul National University at Bongcheon-dong, Gwanak-gu, Seoul, by processing the first position information 810 using the spatial information 820 indicating that the image processing apparatus 100 is located in "Classroom". Also, the image processing apparatus 100 may generate second position information 832 indicating that the image processing apparatus 100 is located in a parking lot in Seoul National University at Bongcheon-dong, Gwanak-gu, Seoul, by processing the first position information 810 using the spatial information 820 indicating that the image processing apparatus 100 is located in "Parking lot". Furthermore, the image processing apparatus 100 may generate second position information 833 indicating that the image processing apparatus 100 is located in a park in Seoul National University at Bongcheon-dong, Gwanak-gu, Seoul, by processing the first position information 810 using the spatial information 820 indicating that the image processing apparatus 100 is located in "Park".

Referring back to FIG. 4, in operation S440, the image processing apparatus according to the present disclosure may perform an operation corresponding to the second position information generated in the operation S430. For example, the image processing apparatus may display the second position information on the screen. Alternatively, the image processing apparatus may change a function setting of the image processing apparatus based on the second position information. The image processing apparatus may provide an alarm to the user based on the second position information, or perform an applied program related to the second position information.

Accordingly, the image processing apparatus according to the present disclosure may generate more detailed position information reflecting a surrounding environment of the image processing apparatus and provide the generated position information to the user. Also, the image processing apparatus according to the present disclosure may generate the second position information about an accurate position of an object presented by the target image by using the first position information and provide the generated second position information to the user.

The image processing apparatus according to the present disclosure may use an object detection technology in order to quickly and accurately determine in which category the target object presented by the target image is included. The object detection technology that may be used by the image processing apparatus according to the present disclosure is described below with reference to FIGS. 9 to 13.

First, an image processing apparatus according to the present disclosure may extract edge information suitable for expressing a shape of an object included in a target image, from the target image, in order to analyze the target image. The image processing apparatus may extract a feature map indicating intensity gradient of pixels of the target image, as the edge information.

The feature map may include a HOG map indicating an HOG feature of an image, but the present disclosure is not limited thereto. For example, the image processing apparatus may extract a feature indicating a Haar-like feature or a Wavelet feature from the target image and analyze the target image based on the extracted feature.

Figure 9:
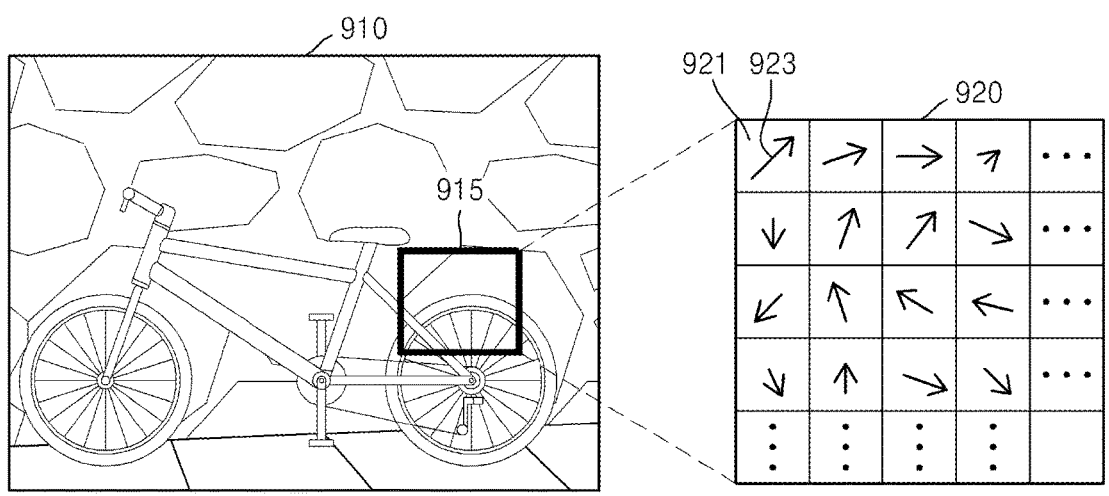
FIG. 9 is a view for describing a process of extracting a feature map from a target image according to an embodiment of the present disclosure.

FIG. 9 is a view for describing a process of extracting a feature map from a target image according to an embodiment of the present disclosure.

FIG. 9 illustrates an example case in which an image processing apparatus according to the present disclosure extracts a HOG feature map 920 from a target image 910.

As illustrated in FIG. 9, the image processing apparatus sections the target image into a plurality of block units (e.g., block unit 915). The image processing apparatus calculates a HOG feature vector 923 based on a size or direction of intensity gradient of pixels in each block 921. The image processing apparatus may extract the HOG feature map 920 about the target image by using the HOG feature vectors calculated for each block.

Next, the image processing apparatus according to the present disclosure may determine a category in which the target object is included, based on the shape of the target object extracted from the target image. The image processing apparatus may determine the category including the target object by comparing a feature map module that is previously learned with respect to the shape of the object included in a predetermined category with the feature map that is extracted with respect to the target image. The feature map model may denote a feature map indicating a feature commonly included by images indicating the objects included in the predetermined category.

In more detail, the image processing apparatus uses a classifier model that learns a feature map previously calculated with respect to the shape of the object included in the predetermined category. The image processing apparatus may determine the category including the target object, by classifying feature map inputs extracted with respect to the target image, by using the classifier model. The feature map model may denote a classifier obtained through learning indicating a feature that is commonly included by images indicating the objects included in a predetermined category.

For example, in order to generate a feature map model of a category, the image processing apparatus may extract a common HOG feature from the HOG features of a plurality of images related to an object included in the category. The image processing apparatus may generate a feature map model by using the common HOG feature of the images.

In doing so, since the size of a feature map model is previously determined, a method of generating an image pyramid including a plurality of image having variously modified sizes of the target image may be used to compare the feature map extracted from the target image with the feature map model.

Figure 10C:
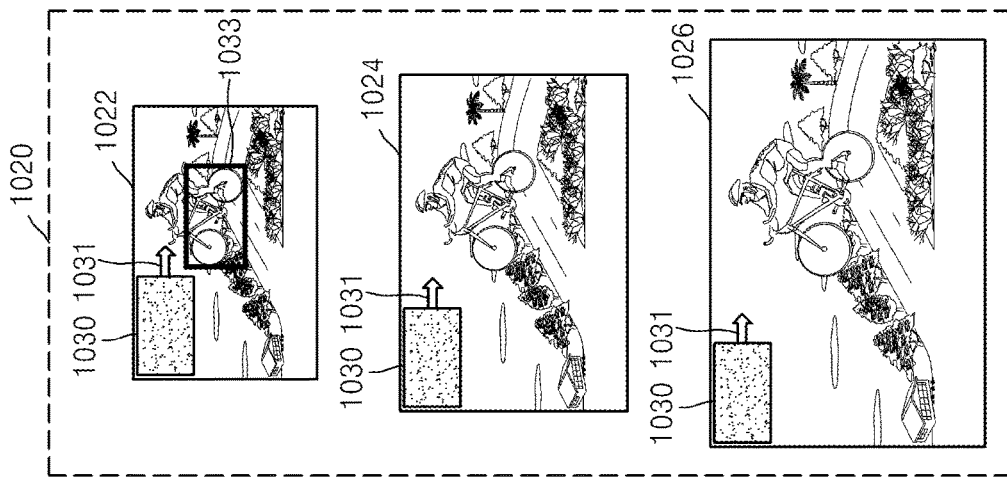
FIGS. 10A, 10B, and 10C are views for describing processes of generating an image pyramid from a target image and comparing the image pyramid with a feature map model according to various embodiments of the present disclosure.
Figure 10B:
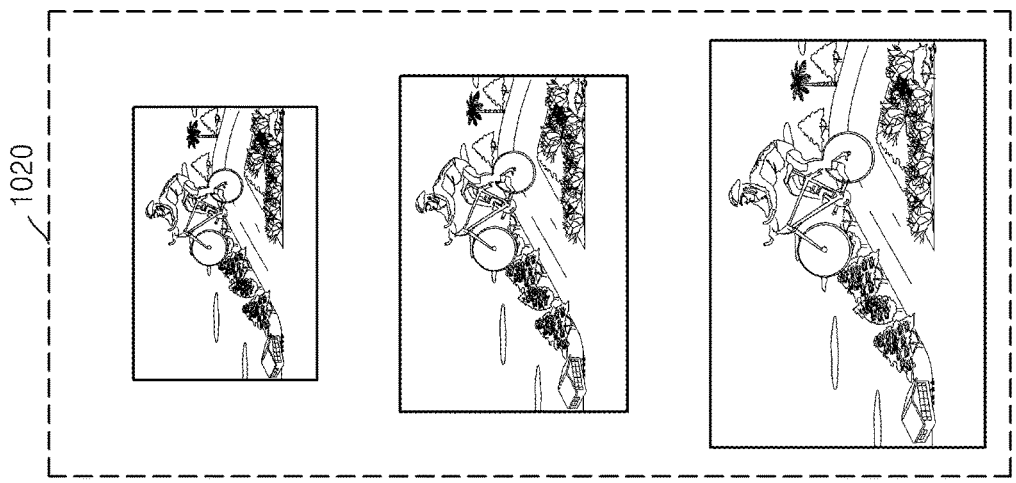
Figure 10A:
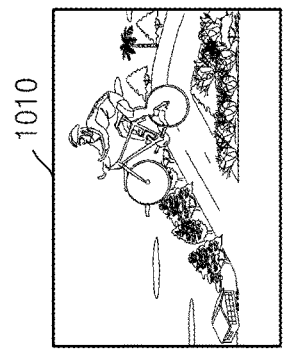

FIGS. 10A, 10B, and 10C are views for describing processes of generating an image pyramid from a target image and comparing the image pyramid with the feature map model according to various embodiments of the present disclosure.

FIGS. 10A, 10B and 10C illustrate an example case of determining whether a target image 1010 includes an image about a target object included in "Bicycle". The image processing apparatus may analyze the target image 1010 by using a feature map model 1030 that is previously learned with respect to "Bicycle".

The shape of the "Bicycle" included in the target image 1010 may have a variety of sizes. However the size of the feature map model 1030 that the image processing apparatus has previously learned with respect to "Bicycle" may be fixed.

Accordingly, in order to analyze the target image 1010 by using the feature map model 1030 having a fixed size, the image processing apparatus may variously modify a size of the target image 1010. The image processing apparatus may generate an image pyramid 1020 including a plurality of images generated by modifying the size of the target image 1010. The image processing apparatus may extract a plurality of feature maps 1022, 1024, and 1026 from the images included in the image pyramid 1020.

The image processing apparatus may determine whether the target image 1010 includes an image about the target object included in the category "Bicycle" by comparing the feature maps 1022, 1024, and 1026 extracted from the target image 1010 with the feature map model 1030 about "Bicycle". The image processing apparatus may compare the feature maps 1022, 1024, and 1026 extracted from the target image 1010 with the feature map model 1030. The image processing apparatus may move the feature map model 1030 in a direction indicated by an arrow 1031 and compare the feature map model 1030 with areas of the feature maps 1022, 1024, and 1026 corresponding to the moved location of the feature map model 1030.

FIGS. 10A, 10B and 10C illustrate a case in which a size of an image 1033 of a bicycle included in a contracted image of the target image 1010 corresponds to the size of the feature map model 1030. As illustrated in FIGS. 10A, 10B and 10C, the image processing apparatus may determine that the target image 1010 includes the image "Bicycle" by comparing the feature map 1022 of the contracted image of the target image 1010 with the feature map model 1030.

Figure 11:
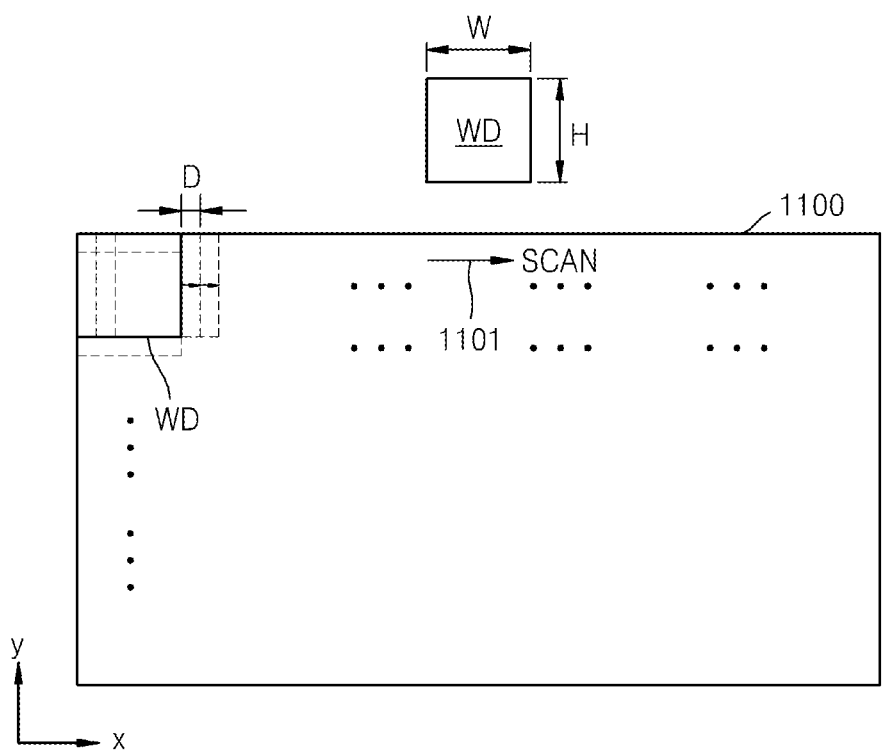
FIG. 11 is a view for describing a process of analyzing a target image in a sliding window method according to an embodiment of the present disclosure.

FIG. 11 is a view for describing a process of analyzing a target image in a sliding window method according to an embodiment of the present disclosure.

As illustrated in FIG. 11, an image processing apparatus according to the present disclosure may perform a scan by moving a window WD having predetermined width W and height H in a direction, for example, along a horizontal direction, that is, an x-axis direction 1101. The scanning of the image processing apparatus may signify an operation of comparing a partial image included in a target image 1100 with the feature map model of a category. The partial image included in the target image 1100 may be an image corresponding to the window WD.

After completing a scan of one row, that is, a scan row, the image processing apparatus may perform a scan of a next scan row. A movement distance D of the window WD during each scan, that is, an interval between neighboring window scans in the horizontal direction may have a range smaller than the width W of the window WD. For example, after performing a scan on a current scan area, the image processing apparatus moves the window WD by a distance corresponding to a number of pixels smaller than a number of pixels equivalent to a size of the width W of the window WD, and performs a scan of a next scan area. Accordingly, the scan areas neighboring in the horizontal direction may be overlapped with each other.

The scan areas neighboring in a vertical direction, that is, a y-axis direction, may be overlapped with each other. For example, after completing the scan of a scan row on which the current window scan is performed, the image processing apparatus shifts the window WD by a distance corresponding to a number of pixels smaller than a number of pixels equivalent to a size of the height H of the window WD, and a scan of a next scan row may be performed. Accordingly, the scan areas neighboring in a vertical direction may be overlapped with each other.

The image processing apparatus according to the present disclosure may use a support vector machines (SVM) algorithm to determine the category including the target object presented by the target image.

The image processing apparatus may analyze the target image in a sliding window method illustrated in FIG. 11. The image processing apparatus may select one of a plurality of predetermined categories. The image processing apparatus may determine whether the target object presented by the target image is included in the selected category. The image processing apparatus may repeatedly perform the operation of determining whether the target object is included in the selected category, with respect to the categories.

An example case in which the image processing apparatus selects a first category and determines whether the target object is included in the selected first category is described below.

The image processing apparatus may generate positive data by extracting a HOG feature from positive samples including a plurality of images related to the first category. The image related to the first category may denote an image having one of the objects classified to be included in the first category. The image processing apparatus may generate negative data by extracting the HOG feature from negative samples including a plurality of images that are not related to the first category. The images that are not related to the first category may denote images that do not have the objects classified to be included in the first category.

The image processing apparatus may place the positive data and negative data in a high dimensional feature space and calculate a hyperplane where a margin between the positive data and the negative data exists. The image processing apparatus may design a filter for determining whether the target image includes an image of the first category based on the calculated hyperplane. The image processing apparatus may calculate a reaction value of a filter for the target image. The reaction value of a filter may be calculated by using a function of a normal vector w of the calculated hyperplane. Accordingly, the image processing apparatus may determine an area of the target image having a high reaction value of a filter to be included in the image of the first category corresponding to the filter.

In other words, in the SVM algorithm, the feature map model may be expressed by a bias value b and the normal vector w of the hyperplane calculated from the positive data and the negative data.

A HOG-SVM technology may denote technology to extract the HOG feature of the target image and detect whether the image of a predetermined category is included in the target image by using the SVM algorithm. In the HOG-SVM technology, when the target image is analyzed by using only one feature map model with respect to a predetermined category, a function of detecting an object when the shapes of parts of the target object in the target image are deformed may be deteriorated.

Accordingly, the image processing apparatus according to the present disclosure may use not only the feature map model about the entire shape of an object included in a predetermined category, but also a mixture of part models using a feature map model corresponding to a shape of a part of the object included in the predetermined category.

The image processing apparatus may use not only a root model (hereinafter, referred to as the root model of the first category) that is a feature map model obtained by previously learning the entire shape of an object included in the first category, but also a plurality of part models (hereinafter, referred to as the part models of the first category) that are feature map models obtained by previously learning the shapes of parts of an object included in the first category.

The image processing apparatus may compare at least one of the root model and the part models of the first category with the feature map extracted from the target image.

In other words, the image processing apparatus may calculate the reaction value of a filter designed based on at least one of the root model and the part models of the first category, with respect to the feature map extracted from the target image.

When the reaction value of the extracted feature map is less than a critical value allotted to at least one of the root model and the part models of the first category, the image processing apparatus may determine that the target image does not include an image of the target object included in the first category. The critical value may be a value that is determined to increase a degree of object detection accuracy to the largest by learning the positive samples and the negative samples of the first category. For example, the image processing apparatus 100 may determine an optimal critical value by using a Gibbs sampling method.

Since the image processing apparatus has a plurality of part models with respect to one category, comparing the target image with all part models of all categories needs complex calculation and takes a lot of time.

Accordingly, the image processing apparatus according to the present disclosure may use a cascade classifier in which a plurality of part filters designed based on part models of an object and a root filter designed based on the root model of a category are arranged in series.

Figure 12:
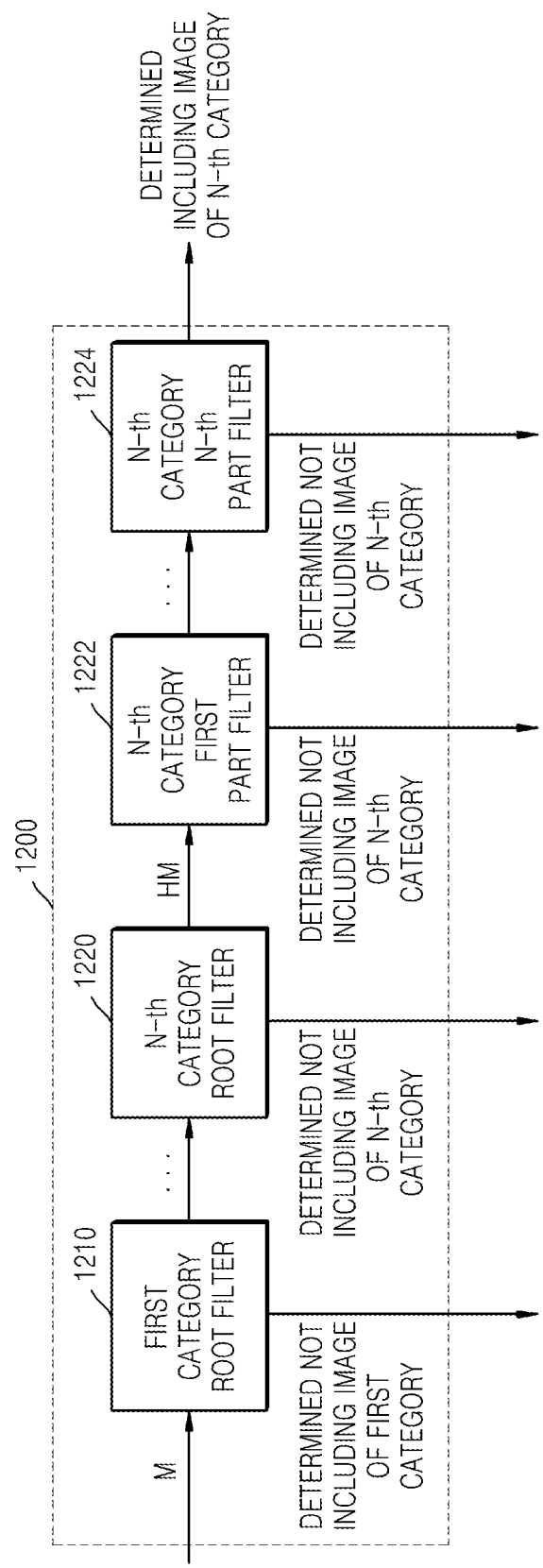
FIG. 12 is a block diagram for describing a cascade classifier according to an embodiment of the present disclosure.

FIG. 12 is a block diagram for describing a cascade classifier according to an embodiment of the present disclosure.

Referring to FIG. 12, a cascade classifier 1200 according to an embodiment of the present disclosure may include a plurality of root filters for a plurality of categories and a plurality of part filters for each category. The cascade classifier 1200 of FIG. 12 may be included in an image analyzer of an image processing apparatus.

The cascade classifier 1200 of FIG. 12 may include a first category root filter 1210 designed based on a root model of a first category and an N-th category designed based on a root model of an N-th category, where N is a natural number. The cascade classifier 1200 of FIG. 12 may include an N-th category root filter 1220, an N-th category first part filter 1222 designed based on a part model of a first part of an object included in the N-th category and an N-th category N-th part filter 1224 designed based on a part model of the N-th part of an object included in the N-th category.

Although FIG. 12 illustrates the first category root filter 1210 and the N-th category root filter 1220 only, the cascade classifier 1200 may include root filters of the second category to the (N−1)th category. Also, although FIG. 12 illustrates only the part filters of the N-th category, the cascade classifier 1200 may include part filters of the first category to the (N−1)th category.

As illustrated in FIG. 12, the image processing apparatus may calculate a reaction value of the first category root filter 1210 about a feature map M extracted from a predetermined area included in the target image. When the reaction value of the first category root filter 1210 is less than a critical value, the image processing apparatus may determine that the area does not include an image of an object included in the first category. Accordingly, the image processing apparatus may increase an operation speed by omitting the operation of comparing the part models of the first category with corresponding areas, with respect to the area that is determined not to include the image of the object included in the first category. In the following description, an image of a category may denote an image of an object included in the category.

The image processing apparatus may repeatedly perform the operation of determining whether the target image includes an image of an object included in each of a plurality of category, with respect to each category.

As illustrated in FIG. 12, the image processing apparatus may calculate a reaction value of the N-th category root filter 1220 with respect to the feature map M extracted from a predetermined area included in the target image. When the reaction value of the N-th category root filter 1220 is less than the critical value, the image processing apparatus may determine that the area does not include the image of the N-th category.

In contrast, when the reaction value of the N-th category root filter 1220 is equal to or greater than the critical value, the image processing apparatus may calculate a reaction value of the N-th category first part filter 1222 with respect to the feature map M extracted from the predetermined area included in the target image.

To reduce an amount of calculation, the image processing apparatus may generate a root model at a resolution that is lower than those of part models in generating feature map models by learning the positive samples and the negative samples. Also, the image processing apparatus may use the feature map M extracted at a low resolution from the predetermined area of the target image when calculating a reaction value of the root filter. When calculating a reaction value of a part filter, the image processing apparatus may use a feature map HM extracted at a high resolution from the predetermined area of the target image. The image processing apparatus may reduce the amount of calculation by calculating a reaction value with respect to a feature map having a different resolution according to filters.

When the reaction value of the N-th category first part filter 1222 is less than the critical value, the area may be determined not to include an area of the first category. In contrast, when the reaction value of the N-th category first part filter 1222 is equal to or greater than the critical value, the image processing apparatus may calculate a reaction value of an N-th category second part filter (not shown) with respect to the feature map HM extracted from the predetermined area included in the target image.

As illustrated in FIG. 12, when the reaction value of all part filters of the N-th category with respect to the feature map HM is equal to or greater than the critical value, the image processing apparatus may determine that the area includes an image of the N-th category. Also, when the reaction value of all part filters of the N-th category with respect to the feature map HM is equal to or greater than the critical value, the image processing apparatus may calculate a matching score to the area included in the target area considering all the root filter and part filters of the N-th category. The image processing apparatus may finally determine whether the area includes an image of the N-th category by comparing the matching score with a predetermined value.

According to the present disclosure, the image processing apparatus including the cascade classifier 1200 excludes the area of the target image that is determined by the root filter of a category to not include the image of the category from a detection area, that is, an area to be detected. Thus, according to the present disclosure, a range of the detection area with respect to the category may be reduced. Accordingly, in the cascade classifier 1200 according to the present disclosure, an effect that the calculation speed increases may be obtained.

On the other hand, the image processing apparatus according to the present disclosure may arrange part filters on the cascade classifier 1200 based on the priority order of the part models of the category, which correspond to the part filters, respectively. The priority order of the part models may be determined by normalizing the part models and calculating a weight value indicating a portion of each part model with respect to all part models. In other words, the image processing apparatus may determine the priority order of the part models by calculating a norm of a part model as the weight value of the part model and normalizing each part model with respect to all part models. The image processing apparatus may improve efficiency of calculation by first comparing a part model having a high weight value and the target image.

Also, the image processing apparatus according to the present disclosure may determine whether the target image includes an image of the corresponding category considering position information of the part models with respect to the root model of the category.

The image processing apparatus according to the present disclosure may perform an operation of learning a plurality of images with respect to the category in order to determine whether the target image includes the image of the category. In the following description, an example case in which the image processing apparatus learns a plurality of images of the first category is described.

The image processing apparatus according to the present disclosure may learn relative positions of part models of the root model of the first category before analyzing the target image. Accordingly, the image processing apparatus may determine whether the target image includes an image of the first category, by further considering position information of the part models of the root model. To determine whether the target image includes the image of the first category, the image processing apparatus may compare the shape of the target object extracted from the target image with the root model and part models of the first category.

To determine whether the target image includes the image of the first category, the image processing apparatus may calculate a sum of the reaction values of the root filter and all part filters of the first category with respect to the shape of the target object. Also, the image processing apparatus 100 may compare positions of parts of the target object with respect to the entire target object by comparing the positions of the part models with respect to the root model of the first category. The image processing apparatus may calculate the matching score by subtracting distances between the positions of parts of the target object and the positions of the part models, from the sum of the reaction values.

The image processing apparatus may determine whether the target object is included in the first category, based on the matching score. For the shape of the target object to have a high matching score, the shape of the target object may have characteristics similar to the root model and part models of the first category. Also, for the shape of the target object to have a high matching score, the shapes of parts of the target object may not be separated far from positions learned with respect to the part models of the first category.

Accordingly, since the image processing apparatus according to the present disclosure calculates the matching score with a penalty with respect to a change in the positions of the parts of the target object, the category including the target object may be determined accurately regardless of the change of the target object or an angle at which the target image is captured.

Figure 13:
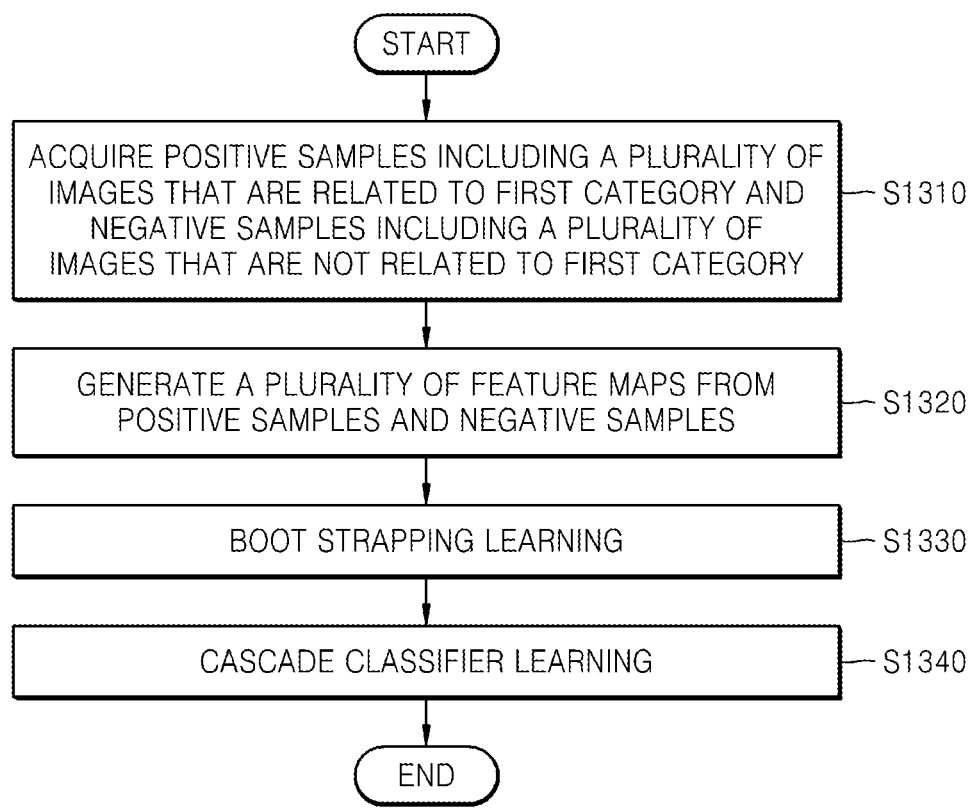
FIG. 13 is a flowchart for describing a method of learning a plurality of images of a category in order to determine whether a target image includes an image of the category according to an embodiment of the present disclosure.

FIG. 13 is a flowchart for describing a method of learning a plurality of images of a category in order to determine whether a target image includes an image of the category according to an embodiment of the present disclosure.

Referring to FIG. 13, in operation S1310, an image processing apparatus according to the present disclosure may obtain positive samples including a plurality of images related to a first category and negative samples including a plurality of image irrelevant to the first category.

In operation S1320, the image processing apparatus according to the present disclosure may generate a plurality of feature maps from the positive samples and the negative samples. For example, the image processing apparatus may generate a plurality of HOG feature maps by extracting the HOG feature from the positive samples and the negative samples.

In operation S1330, the image processing apparatus according to the present disclosure may perform boot strapping learning to learn a root model of the first category.

First, the image processing apparatus may learn the root model of the first category by using a plurality of feature maps generated from the positive samples and the negative samples.

The image processing apparatus may conduct a sliding window search on the images that are not related to the first category, by using a learned root model. The image processing apparatus checks whether there is an image that is incorrectly determined to be related to the first category though it is not related to the first category, as a result of the sliding window search. The image processing apparatus may relearn the root model by including the incorrectly determined image in the negative samples. In other words, the image processing apparatus may relearn the root model by adding to the negative samples the image that is determined to be an image of the first category through it is not related to the first category.

As the image processing apparatus repeats the relearning process by adding an incorrectly detected image in to negative samples, accuracy in detecting an object may be improved.

In operation S1340, the image processing apparatus according to the present disclosure may perform cascade classifier learning.

In learning the first category, the image processing apparatus may divide the first category into the root model and the part models. The image processing apparatus may learn the root model and the part models. The image processing apparatus according to the present disclosure may consider the priority order of the part models in determining whether the target image includes the image of a category. The image processing apparatus may learn cascade classifiers in which a plurality of part filters are arranged in series, in learning the priority order of the part models.

The image processing apparatus may learn a critical value for each filter after determining the order of arranging a plurality of part filters, that is, the priority order of the part models. The critical value of each filter may be an experimentally optimized value. For example, the image processing apparatus may obtain the critical value showing the maximum detection rate while varying the critical value of one part filter, after the critical values of all part filters except for one part filter in a serial structure, by using the Gibbs sampling method. The image processing apparatus may calculate the optimized critical value by repeating the process on each part filter.

An embodiment of the present disclosure may be embodied in form of a recording medium including computer executable command languages such as a program module executed by a computer. A computer-readable storage medium may be a useable medium that may be accessed by a computer and may include all of volatile and non-volatile media or a separable and inseparable media. Also, the computer-readable storage medium may include all of a computer storage medium and a communication medium. The computer-readable storage medium may include all of volatile and non-volatile media or a separable and inseparable media embodied by a certain method or technology for storing information such as computer-readable command languages, data structures, program modules, or other data. The communication medium may typically include computer-readable command languages, data structures, program modules, or other data of a modulated data signal, or other transmission mechanism, and may also include a certain information forwarding medium.

It should be understood that the various embodiments described herein should be considered in a descriptive sense only and not for purposes of limitation. Descriptions of features or aspects within each embodiment should typically be considered as available for other similar features or aspects in other embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of processing an image by using an image processing apparatus, the method comprising:
   acquiring, by the image processing apparatus, a target image;
   determining additional information related to the target image; and
   storing the target image with the additional information by mapping the target image with the additional information, wherein the determining of the additional information comprises:
   determining a category of a target object included in the target image,
   acquiring spatial information including information on a place where at least one object included in the category is located, and
   determining the additional information including the spatial information.

2. The method of claim 1,
   wherein the acquiring of the target image comprises acquiring information indicating a time when the target image is acquired,
   wherein the additional information further comprises at least one keyword related to the information indicating the time, and
   wherein the method further comprises:
   generating second position information including information on position of the target object based on the spatial information and first position information including information on position where the target image is captured, and
   performing an operation based on the second position information.

3. The method of claim 1, wherein the acquiring of the spatial information comprises:
   extracting a shape of the target object included in the target image;
   determining the category of the target object based on the extracted shape, and
   acquiring the spatial information including at least one keyword indicating a position related to the category.

4. The method of claim 3,
   wherein the extracting of the shape of the target object included in the target image comprises extracting a feature map indicating an intensity gradient of pixels of the target image, and
   wherein the determining of the category including the target object comprises comparing the extracted feature map with at least one of feature map models that are previously learned with respect to a shape of an object included in a first category.

5. The method of claim 4, wherein the comparing of the extracted feature map with the at least one of the feature map models comprises:
   calculating a reaction value of a filter designed based on the at least one of the feature map models with respect to the extracted feature map; and
   if the reaction value is less than a critical value allotted to the at least one of the feature map models, determining that the target object is not included in the first category.

6. The method of claim 4, wherein the comparing of the extracted feature map with the at least one of the feature map models comprises:
   performing a first determination process of determining whether the target object is included in the first category by comparing the extracted feature map with a root model that is a previously learned feature map model with respect to an entire shape of an object included in the first category; and if the target object is determined to be included in the first category according to a result of the first determination process, comparing the extracted feature map with at least one part model of part models that are previously learned feature map models with respect to shapes of parts of an object included in the first category.

7. The method of claim 6, wherein the root model is previously learned by:
obtaining positive samples including a plurality of images related to the first category;
obtaining negative samples including a plurality of images related to the first category;
generating a plurality of feature maps from the positive samples and the negative samples; and
learning the root model of the first category by using the plurality of feature maps generated from the positive samples and the negative samples.

8. The method of claim 6, wherein the extracting of the feature map comprises:
extracting a first feature map from the target image at a first resolution to compare with the root model; and
extracting a second feature map from the target image at a second resolution to compare with the at least one part model of the part models, the first resolution being lower than the second resolution.

9. The method of claim 6, wherein the comparing of the extracted feature map with the at least one part model of the part models comprises:
selecting the at least one part model of the part models based on a priority order of the part models; and
comparing the extracted feature map with the selected part model.

10. The method of claim 6, wherein the comparing of the extracted feature map with the at least one part model of the part models comprises comparing the extracted feature map with the at least part model one of the part models considering position information of the part models with respect to the root model.

11. An image apparatus comprising:
a storage; and
a controller configured to:
acquire a target image,
determine additional information related to the target image,
control the storage to store the target image with the additional information by mapping the target image with the additional information,
determine a category of a target object included in the target image,
acquire spatial information including information on a place where at least one object included in the category is located, and
determining the additional information including the spatial information.

12. The image processing apparatus of claim 11,
wherein the controller is further configured to:
acquire information indicating a time when the target image is acquired,
generate second position information including information on a position of the target object based on the spatial information and first position information including information on a position where the target image is capture, and
perform an operation based on the second position information, and wherein the additional information further comprises at least one keyword related to the information indicating the time.

13. The image processing apparatus of claim 11, wherein the controller is further configured to:
extract a shape of the target object included in the target image,
determine the category of the target object based on the extracted shape, and
acquire the spatial information including at least one keyword indicating position related to the category.

14. The image processing apparatus of claim 13, wherein the controller is further configured to:
extract a feature map indicating an intensity gradient of pixels of the target image, and
compare the extracted feature map with at least one feature map model that is previously learned with respect to a shape of an object included in a first category.

15. The image processing apparatus of claim 14,
wherein the controller is further configured to calculate a reaction value of a filter designed based on the at least one feature map model with respect to the extracted feature map, and
wherein, if the reaction value is less than a critical value allotted to the at least one feature map model, the target object is determined not to be included in the first category.

16. The image processing apparatus of claim 14, wherein the controller is further configured to:
perform a first determination process of determining whether the target object is included in the first category by comparing the extracted feature map with a root model that is a previously learned feature map model with respect to the shape of the object included in the first category, and
if the target object is determined to be included in the first category according to a result of the first determination process, compare the extracted feature map with at least one part model of part models that are previously learned feature map models with respect to shapes of parts of the object included in the first category.

17. The image processing apparatus of claim 16, wherein the controller is further configured to generate the part models with respect to parts of the object by extracting a first feature map from the target image at a first resolution to compare with the root model and extracting a second feature map from the target image at a second resolution to compare with the at least one part model of the part models, the first resolution being lower than the second resolution.

18. The image processing apparatus of claim 16, wherein the controller is further configured to:
select at least one part model of the part models based on a priority order of the part models, and
compare the extracted feature map with the selected at least one part model.

19. A non-transitory computer readable storage medium having stored thereon a program, which when executed by a computer, performs a method comprising:
acquiring a target image;
determining additional information related to the target image; and
storing the target image with the additional information by mapping the target image with the additional information,
wherein the determining of the additional information comprises:

determining a category of a target object included in the target image, acquiring spatial information including information on a place where at least one object included in the category is located, and determining the additional information including the spatial information.

20. The method of claim 1, further comprising:

receiving a keyword from a user;

based on the additional information and the received keyword, searching for an image related to the received keyword from among a plurality of target images stored in the image processing apparatus; and displaying the searched image.

21. The image processing apparatus of claim 11, further comprising a display, wherein the controller is further configured to:

receive a keyword from a user, based on the additional information and the received keyword, search for an image related to the received keyword from among a plurality of target images stored in the storage, and control the display to display the searched image.

* * * * *